United States Patent
Won

(10) Patent No.: US 8,195,936 B2
(45) Date of Patent: Jun. 5, 2012

(54) METHOD FOR TRANSMITTING AND RECEIVING DATA OF A TERMINAL IN A COMMUNICATION SYSTEM AND COMMUNICATION TERMINAL THEREOF

(75) Inventor: Jong-Se Won, Bucheon-si (KR)

(73) Assignee: Samsung Electronics Co., Ltd (KR)

( * ) Notice: Subject to any disclaimer, the term of this patent is extended or adjusted under 35 U.S.C. 154(b) by 715 days.

(21) Appl. No.: 12/268,046

(22) Filed: Nov. 10, 2008

(65) Prior Publication Data

US 2009/0138952 A1 May 28, 2009

(30) Foreign Application Priority Data

Nov. 8, 2007 (KR) .................... 10-2007-0113610

(51) Int. Cl.
*H04L 29/06* (2006.01)
*H04L 9/00* (2006.01)

(52) U.S. Cl. ........ 713/159; 713/155; 713/156; 713/157; 713/158; 726/3; 726/4; 726/5; 726/6; 726/7

(58) Field of Classification Search .......... 713/150–194; 726/1–36; 380/1–287
See application file for complete search history.

(56) References Cited

U.S. PATENT DOCUMENTS

| | | | | |
|---|---|---|---|---|
| 6,892,308 | B1 * | 5/2005 | Medvinsky | 726/6 |
| 7,856,660 | B2 * | 12/2010 | Lagimonier et al. | 726/22 |
| 2007/0101405 | A1 * | 5/2007 | Engle et al. | 726/4 |

* cited by examiner

*Primary Examiner* — Longbit Chai
(74) *Attorney, Agent, or Firm* — The Farrell Law Firm, P.C.

(57) ABSTRACT

A method for transmitting and receiving data of a terminal in a communication system and a communication terminal thereof are provided, which can minimize an exposure of authentication information. A communication terminal includes a rolling token generation unit for generating the rolling tokens; a memory for storing the generated rolling tokens; and a control unit for, if an authentication of the other terminal for performing a communication is completed, generating and transmitting a rolling token whenever a transmission to the other terminal is performed, and in case of receiving a specified rolling token from the other terminal, determining whether the rolling token currently received from the other terminal is identical to the rolling token most recently transmitted.

9 Claims, 4 Drawing Sheets

METHOD FOR TRANSMITTING AND RECEIVING DATA OF A TERMINAL IN A COMMUNICATION SYSTEM AND COMMUNICATION TERMINAL THEREOF

PRIORITY

This application claims priority under 35 U.S.C. §119(a) to an application entitled "Method for Transmitting and Receiving Data of Terminal in Communication System and Communication Terminal Thereof", filed in the Korean Industrial Property Office on Nov. 8, 2007 and assigned Serial No. 2007-113610, the contents of which are incorporated herein by reference.

BACKGROUND OF THE INVENTION

1. Field of the Invention

The present invention relates to a method for transmitting data to and receiving data from a terminal in a communication system and a communication terminal in which the method is performed. More particularly, the present invention relates to a method for transmitting and receiving data of a terminal in a communication system and a communication terminal thereof, which can minimize exposure of authentication information.

2. Description of the Related Art

Data transmission and reception between a server and a terminal or between terminals is performed in a manner where a terminal obtains user authentication by directly transmitting a user ID and a password to a server or an opposite terminal.

FIG. 1 is a flowchart illustrating a conventional method for transmitting and receiving data of a terminal in a communication system. In FIG. 1, for example, terminal A 100 may request data from a server or terminal B 200.

Terminal A 100 requests authentication from the server or terminal B 200 by transmitting a password or authentication information of an authentication certificate (hereinafter, "certificate") to a server or terminal B 200 (step S10). Terminal B 200 authenticates terminal A 100 using the password or certificate received from terminal A 100 (step S12). In this example, the server or terminal B 200 has already received the pre-stored password or certificate of terminal A 100.

If the password or certificate transmitted from the terminal A 100 is identical to the pre-stored password or certificate of terminal A 100, Terminal B 200 completes the authentication of terminal A 100. The server or terminal B 200 transmits an authentication acknowledgement response to terminal A 100, in step S16. Once the authentication is completed, terminal A 100 requests specified data from the server or terminal B 200, in step S16, and the server or terminal B 200 transmits the data requested by terminal A 100 as a response, in step S18.

The above-described data transmission and reception is performed in a state where authentication information of the terminal A 100, i.e. an Identification (ID) of the terminal A 100, and a password or certificate corresponding to the ID, have already been stored in the server or terminal B 200. Also, terminal A 100, in the process of transmitting and receiving data with the server or terminal B 200, must continually transmit the password or certificate. Once the authentication of terminal A 100 is completed, terminal B 200, as a response, transmits data desired by terminal A 100.

According to the above-described method for transmitting and receiving data, since terminal A 100 must transmit the password or certificate whenever the terminal A 100 requests the data from the server or terminal B 200, the data transmission and reception procedure is cumbersome. Also, preventing a user from illegally invading communication lines and seizing the password or certificate of terminal A 100 is difficult, and thus corresponding man-in-the-middle attacks or replay attacks cannot be prevented.

Accordingly, there is a need for a method for transmitting and receiving data, which can prevent man-in-the-middle attacks or replay attacks and safely perform data transmission and reception by minimizing an exposure of authentication information, such as a password, etc., during performance of the data transmission and reception between a terminal and a server or between terminals.

SUMMARY OF THE INVENTION

Accordingly, the present invention has been designed to solve the above and other problems occurring in the prior art, and provides a method for transmitting and receiving data of a terminal in a communication system and a communication terminal thereof, which can minimize exposure of authentication information.

In order to accomplish the above and other objects, there is provided a communication terminal, according to the present invention, which includes a rolling token generation unit for generating the rolling tokens; a memory for storing the generated rolling tokens; and a control unit for, if an authentication of another terminal for performing communication is completed, generating and transmitting a rolling token whenever a transmission to the other terminal is performed, and in case of receiving a specified rolling token from the other terminal, determining whether the rolling token currently received from the other terminal is identical to the rolling token most recently transmitted.

In accordance with another aspect of the present invention, there is provided a method for transmitting and receiving data of a terminal in a communication system, which includes receiving, by the terminal, an authentication request from another terminal, and if the requested authentication of the other terminal is completed, generating and storing a specified rolling token; transmitting the generated specified rolling token to the other terminal; receiving, from the other terminal, the transmitted specified rolling token and a rolling token generated by the other terminal; determining whether the stored specified rolling token is identical to the received specified rolling token, and if the stored specified rolling token is identical to the received specified rolling token, generating and storing a new rolling token; and transmitting the rolling token generated by the other terminal and the rolling token generated in the fourth step to the other terminal.

In accordance with still another aspect of the present invention, there is provided a method for transmitting and receiving data of a terminal in a communication system, which includes of requesting, by the terminal, an authentication from another terminal, and if the requested authentication is completed, receiving from the other terminal a rolling token generated by the other terminal; generating and storing, by the terminal, a specified rolling token; and transmitting, by the terminal, the rolling token generated by the other terminal and the rolling token generated in the second step to the other terminal.

In accordance with still another aspect of the present invention, there is provided a method for transmitting and receiving data of a terminal in a communication system including a first terminal and a second terminal, which includes receiving an authentication request from the first terminal, and if the requested authentication of the first terminal is completed, generating and transmitting a first rolling token to the first terminal; receiving, from the first terminal, the first rolling token and a second rolling token generated by the first terminal; receiving, from the second terminal, the first rolling token and a third rolling token generated by the second terminal; if the first rolling token received from the first terminal and the second terminal is identical to the generated first rolling token, requesting authentication information from the first terminal and the second terminal; receiving the requested authentication information from the first terminal and the second terminal, and determining whether the received authentication information is correct; and determining that the first terminal, of which the authentication is completed, is the terminal of which the authentication information is correct in accordance with the determination result, and generating and transmitting a fourth rolling token to the determined terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
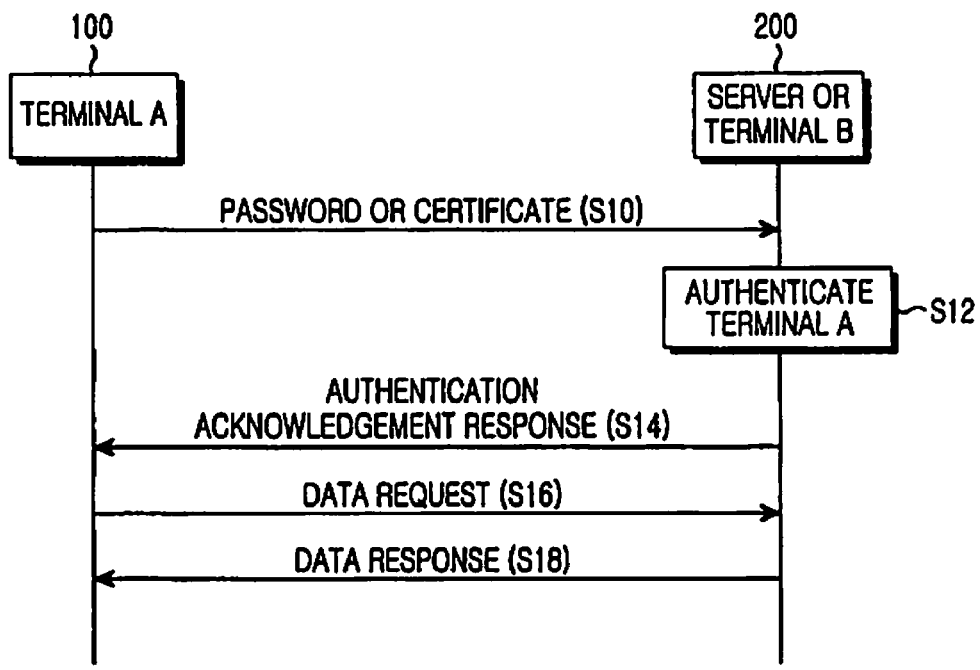
FIG. 1 is a flowchart illustrating a conventional method for transmitting and receiving data of a terminal in a communication system.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when such a detailed description may obscure the subject matter of the present invention.

Figure 2:
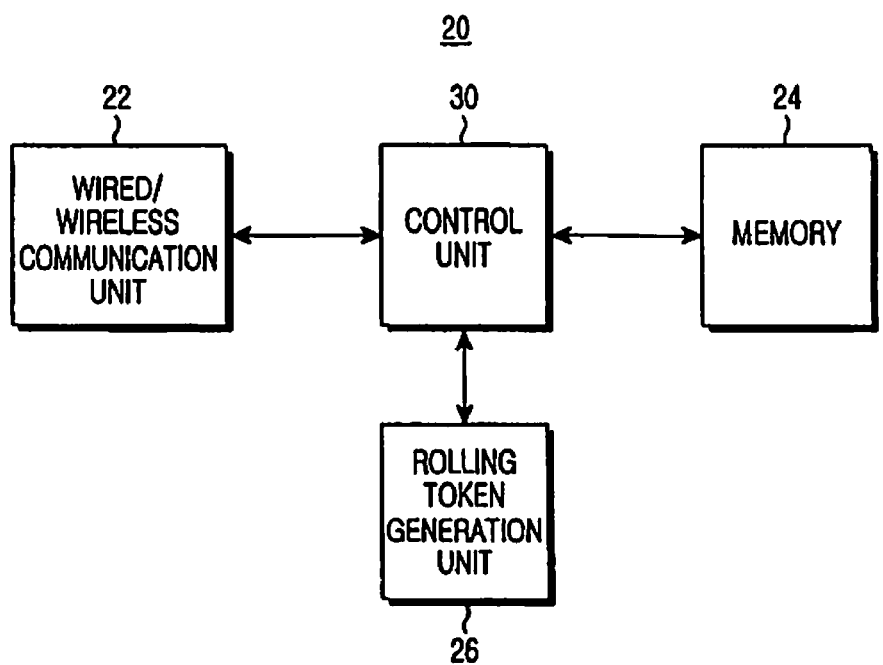
FIG. 2 is a block diagram illustrating the schematic configuration of a terminal in a communication system according to an embodiment of the present invention.

FIG. 2 is a block diagram illustrating the schematic configuration of a terminal in a communication system according to an embodiment of the present invention.

A terminal 20 includes a wired/wireless communication unit 22, a memory 24, a rolling token generation unit 26, and a control unit 30. The wired/wireless communication unit 22 performs a wired/wireless communication function of the terminal 20. The terminal 20 transmits and receives data through the wired/wireless communication unit 22. The wired/wireless communication unit 22 requests authentication by transmitting authentication information, such as an ID, a password, or an authentication certificate to an opposite terminal or a server. In performing data transmission and reception between terminals, a server, or a terminal that acts as a server, receives authentication information, such as an Identification (ID), a password, a certificate, etc., from an opposite terminal.

The memory 24 may be a program memory or a data memory. In the memory 24, various kinds of information required for controlling the operation of the terminal are stored. The memory 24 also stores therein authentication information, such as an ID, a password, a certificate, etc. The memory 24 also stores therein rolling tokens generated by the rolling token generation unit 26, and further stores therein rolling tokens received from an opposite terminal through the wired/wireless communication unit 22.

In an embodiment of the present invention, in the case where the terminal 20 that functions as a server in performing the data transmission and reception between terminals, the memory 24 stores therein authentication information, such as an ID, a password, etc., of the opposite terminal.

The rolling token generation unit 26 generates rolling tokens under the control of the control unit 30 to be described hereinafter. A rolling token includes a random number, a timestamp, etc. The random number is a randomly generated numeral, and the timestamp is a rolling token generation time. In another embodiment of the present invention, the timestamp indicates an effective time of a rolling token.

The control unit 30 controls the whole operation of the terminal 20.

In an embodiment of the present invention, the control unit 30 determines whether a rolling token received through the wired/wireless communication unit 22 is identical to a rolling token stored in the memory 24 by comparing the rolling tokens with each other. If the rolling tokens are identical to each other, the control unit 30 controls the rolling token generation unit 26 to generate a new rolling token, and stores the generated rolling token in the memory 24. If the rolling token received through the wired/wireless communication unit 22 is not identical to the rolling token pre-stored in the memory 24, the control unit 30 may consider the terminal having transmitted the rolling token to be an illegal user and terminate the connection with the terminal.

The control unit 30, if the rolling tokens are received from the opposite terminal, determines whether the rolling token most recently generated and stored in the memory 24, to be transmitted to the opposite terminal, is identical to the rolling token currently received from the opposite terminal by comparing the two rolling tokens with each other. As described above, if the rolling token most recently transmitted to the opposite terminal returns in performing the data transmission and reception with the opposite terminal, the control unit 30 controls the terminal to generate and transmit a new rolling token to the opposite terminal. The control unit 30 also controls the terminal to repeat the above-described operation during the data transmission and reception with the opposite terminal.

Figure 3:
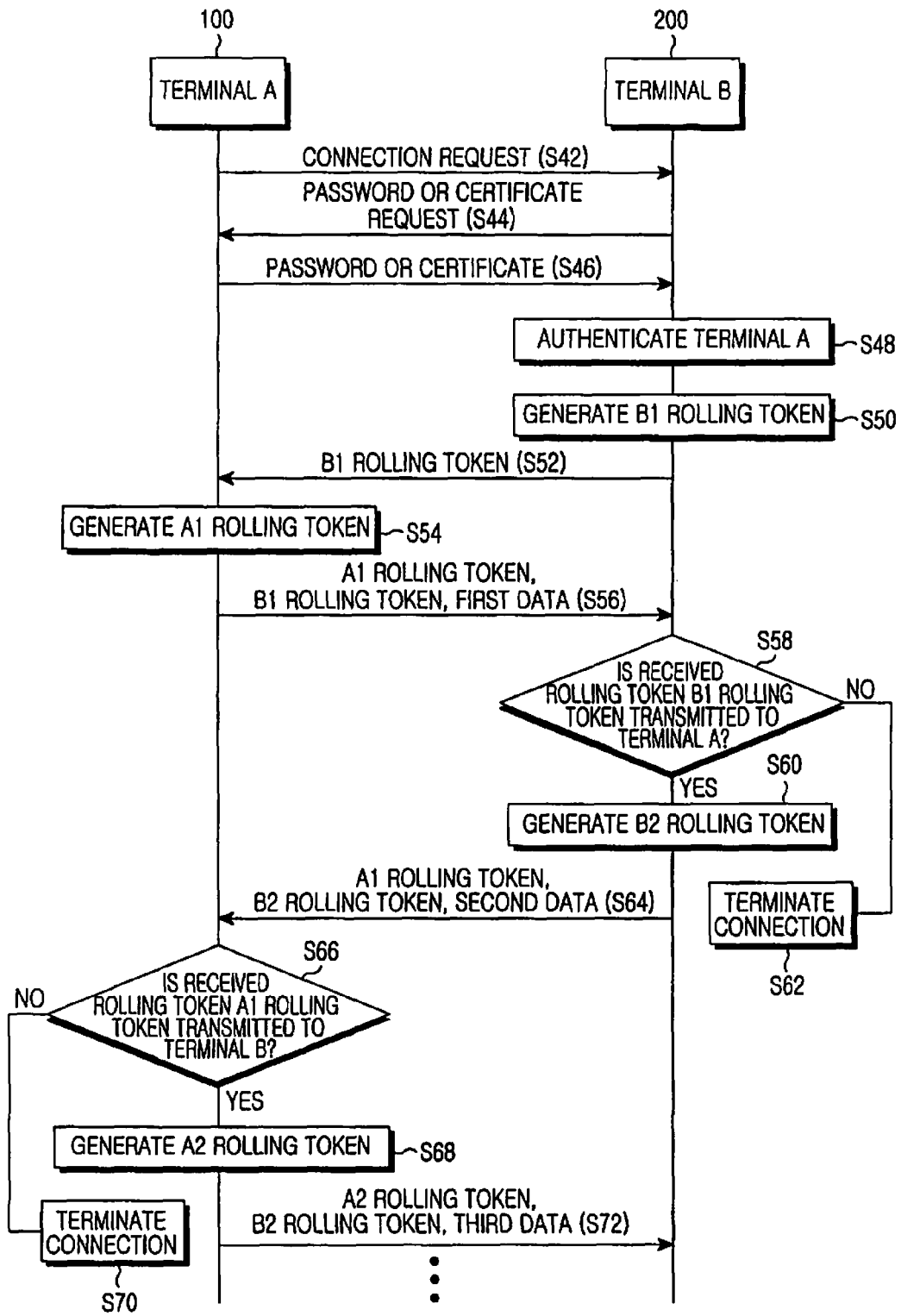
FIG. 3 is a flowchart illustrating a method for transmitting and receiving data of a terminal in a communication system according to an embodiment of the present invention.

FIG. 3 is a flowchart illustrating a method for transmitting and receiving data of a terminal in a communication system according to an embodiment of the present invention.

In FIG. 3, for example, terminal A 100 performs data transmission and reception with terminal B 200, and terminal B 200 functions as a server that authenticates terminal A 100 by receiving an ID, a password, or a certificate from terminal A 100.

Terminal A 100 transmits a connection request to terminal B 200, in step S42. Terminal B 200, upon receiving the connection request from terminal A 100 in step S42, requests a password or a certificate from terminal A 100, in step S44.

If terminal A 100 transmits the password or the certificate to terminal B 200 (step S46), terminal B 200 authenticates terminal A 100 (step S48).

Terminal A 100 corresponds to a user registered in terminal B 200, and the authentication information, such as an ID, a password, or a certificate, of terminal A 100 has been stored in terminal B 200. Terminal B 200 determines whether the password or the certificate received from terminal A 100 is identical to the password or the certificate pre-stored in the memory 24 by comparing the passwords or certificates with each other, and if the passwords or the certificates are identical to each other, the terminal B 200 authenticates terminal A 100 as a rightful user.

Also, although not illustrated in FIG. 3, terminal A 100 may transmit both the ID and the password to terminal B 200. Terminal B 200 receives the ID and the password from terminal A 100 through the wired/wireless communication unit 22 in a state where the ID and the password of terminal A 100 are stored in terminal B 200. Terminal B 200 compares the received ID and password with the pre-stored ID and password, and if the received and pre-stored IDs and passwords are identical to each other, terminal B 200 authenticates terminal A 100 by confirming that terminal A 100 is a rightful user.

Terminal B 200, which has authenticated terminal A 100, generates a B1 rolling token, in step S50, and transmits the generated B1 rolling token to terminal A 100, in step S52. Terminal A 100, upon receiving the B1 rolling token from terminal B 200, generates an A1 rolling token, in step S54, and transmits the A1 rolling token, the B1 rolling token, and first data to terminal B 200, in step S56. Terminal B 200 receives the A1 rolling token, the B1 rolling token, and the first data from the terminal A 100, and determines whether the rolling token B1 received from terminal A 100 is the same as the B1 rolling token transmitted from Terminal B 200 by the terminal A 100 in step S52.

Terminal B 200 determines whether the received rolling token is the B1 rolling token which terminal B 200 has transmitted to terminal A 100 in step S52, in step S58. Terminal B 200 determines whether the B1 rolling token stored in the memory 26 is identical to the B1 rolling token received from terminal A 100 by comparing the two B1 rolling tokens with each other.

If the received rolling token is not the B1 rolling token which terminal A 100 has transmitted ("No" in step S58), terminal B 200 terminates the connection with terminal A 100. When the B1 rolling token stored in terminal B 200 is not identical to the B1 rolling token received from terminal A 100, the terminal A 100 is not the terminal authenticated in step S42. Accordingly, terminal B 200 terminates the connection with terminal A 100 without transmitting data to terminal A 100.

If the rolling token received in step S56 is the B1 rolling token transmitted by the terminal A 100 ("Yes" in step S58), terminal B 200 confirms that terminal A 100 is the terminal authenticated in step S48. Terminal B 200 generates a B2 rolling token in step S60, and transmits the A1 rolling token, the B2 rolling token, and the second data to terminal A 100, in step S64.

In step S66, terminal A 100 determines whether the rolling token received from terminal B 200 is the A1 rolling token transmitted to terminal B 200 in step S56. In the same manner as terminal B 200, terminal A 100 stores the generated A1 rolling token in the memory 24, and compares the A1 rolling token received from terminal B 200 with the A1 rolling token pre-stored in the memory 24. Only in the case where the two A1 rolling tokens are identical to each other, terminal B 200 is confirmed as the terminal with which terminal A 100 has intended to perform data transmission and reception.

If it is determined that the received rolling token is not the A1 rolling token transmitted to terminal B 200 as a result of determination in step S66 ("No" in step S66), terminal A 100 determines that terminal B 200 is not the terminal that has transmitted the password or certificate. In this case, terminal A 100 terminates the connection with terminal B 200, in step S70.

If it is determined that the received rolling token is the A1 rolling token transmitted to terminal B 200 as a result of determination in step S66 ("Yes" in step S66), terminal A 100 generates an A2 rolling token, in step S68. Terminal A 100 transmits the generated A2 rolling token, the B2 rolling token received from terminal B 200 in step S64, and the third data to terminal B 200, in step S72.

Terminal A 100 or terminal B 200 determines whether the received rolling token is identical to the rolling token most recently generated by the corresponding terminal and stored in the memory 24, and only in the case where the rolling tokens are identical to each other, the determination confirms that the terminal that has transmitted the rolling token is the terminal that can transmit and receive the data. If the rolling tokens are confirmed, terminal A 100 or terminal B 200 generates a new rolling token, stores the new rolling token in the memory 24, and transmits the new rolling token to the opposite terminal. Also, the terminal A 100 and terminal B 200 repeat the above-described process to perform the data transmission and reception.

As described above, if the rolling token received from an opposite terminal is identical to the rolling token pre-stored in the memory 24 by a receiving terminal, the receiving terminal generates a new rolling token to avoid the duplicate use of the rolling token, and thus the exposure of the rolling token can be minimized in performing the data transmission and reception between the terminals.

In an embodiment of the present invention, first through third data are certain data transmitted or received between terminal A 100 and terminal B 200. For example, if terminal A 100 requests certain data by transmitting the first data to terminal B 200, terminal B 200 responds to the data request by transmitting the second data to terminal A 100.

Figure 4:
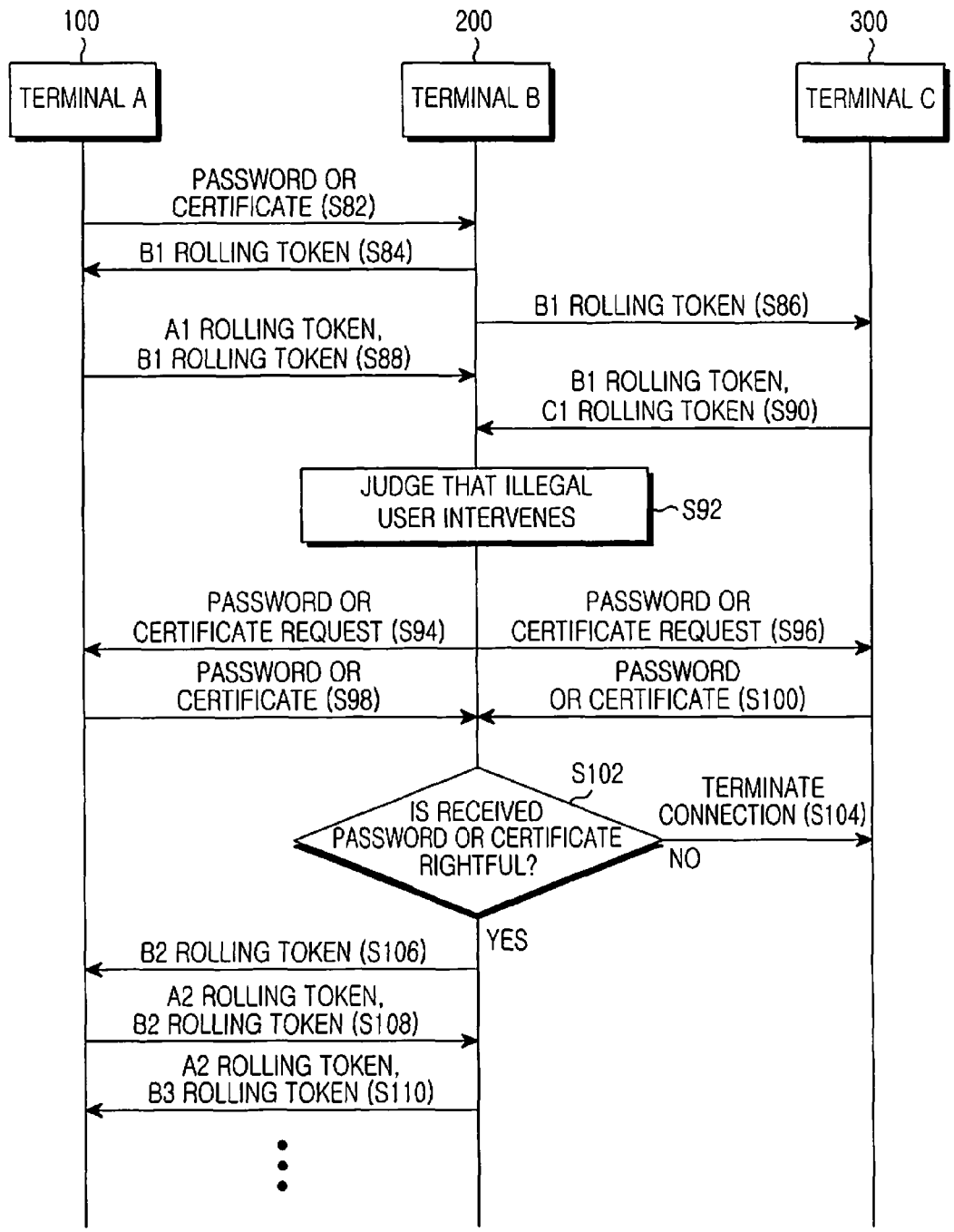
FIG. 4 is a flowchart illustrating a method for transmitting and receiving data of a terminal in a communication system according to another embodiment of the present invention.

FIG. 4 is a flowchart illustrating a method for transmitting and receiving data of a terminal in a communication system according to another embodiment of the present invention.

Terminal A 100 transmits a password or a certificate to terminal B 200, in step S82. Terminal B 200 authenticates terminal A 100, and generates B1 rolling token. Terminal B 200 transmits the B1 rolling token to terminal A 100, in step S84. In another embodiment of the present invention, it is assumed that terminal C 300 has seized the B1 rolling token that is transmitted to terminal A 100, before terminal A 100 receives the B1 rolling token instep S86. Terminal C 300 is a terminal that has not been authenticated by terminal A 100, and thus corresponds to a user who intends to illegally receive the data of terminal B 200.

Terminal A 100, which has received the B1 rolling token from terminal B 200, generates an A1 rolling token. Then, terminal A 100 transmits the generated A1 rolling token and the B1 rolling token to terminal B 200. Terminal C 300 generates a C1 rolling token in the same manner as terminal A 100 generates the A1 rolling token, and transmits the B1 rolling token, and the C1 rolling token to terminal B 200, in step S90. Terminal B 200 receives the B1 rolling tokens from the terminals A 100 and C 300, respectively. Since the B1 rolling token is generated by terminal B 200 for the data transmission and reception with terminal A 100 after the terminal A 100 is authenticated, the B1 rolling token is information that is not shared with other terminals. Since terminal B 200 receives the B1 rolling tokens from terminals A 100 and C 300, terminal B 200 determines that an illegal user intervenes during the data transmission and reception with terminal A 100.

Terminal B 200 requests the password or certificate from all terminals that have transmitted the B1 rolling tokens, in steps S94 and S96. Terminal A 100 and terminal C 300, which have been requested to transmit the password or certificate, transmit the passwords or certificates to terminal B 200, respectively, in steps S98 and S100.

Terminal B 200 can determine which user is the illegal user by using the password or certificate received from terminal A 100 in step S98 and the password or certificate received from terminal C 300 in step S100. Terminal B 200 determines whether the received password or certificate is correct, in step S102. Terminal B 200, which has authenticated terminal A 100 by receiving the password or certificate in step S82, compares the password or certificate received from the respective terminal with the password or certificate received in step S82 in order to find out the illegal user. Terminal B 200 determines that the terminal having transmitted the identical password or certificate is a rightful user.

If it is determined that the received password or certificate is not rightful as a result of determination in step S102 ("No" in step S102), terminal B 200 determines that the terminal having transmitted the corresponding password or certificate is an illegal user. In the example according to FIG. 4, terminal C 300 is determined to be an illegal user, and terminal B 200 terminates the connection with terminal C 300, in step S104.

If the received password or certificate is determined to be correct as a result of the determination in step S102, terminal B 200 determines that the terminal having transmitted the corresponding password or certificate is a rightful user. In the example according to FIG. 4, since the password or certificate transmitted from terminal A 100 is identical to the password or certificate of the terminal authenticated by terminal B 200 in step S82, terminal B 200 determines the terminal A 100 as a rightful user. Terminal B 200 generates a B2 rolling token, and transmits the generated B2 rolling token to terminal A 100, so that the data transmission and reception with terminal A 100 is resumed.

Terminal A 100, which has received the B2 rolling token from terminal B 200, generates an A2 rolling token, and transmits the A2 rolling token and the B2 rolling token to terminal B 200, in step S108. Terminal B 200 confirms that the B2 rolling token received from terminal A 100 is the rolling token transmitted to terminal A 100 in step S106, and generates a B3 rolling token. Terminal B 200 transmits the A2 rolling token and the B3 rolling token to terminal A 100, in step S110.

As described above, according to another embodiment of the present invention, terminal A 100 and terminal B 200 perform the data transmission and reception as they newly generate and transmit rolling tokens.

Figure 5:
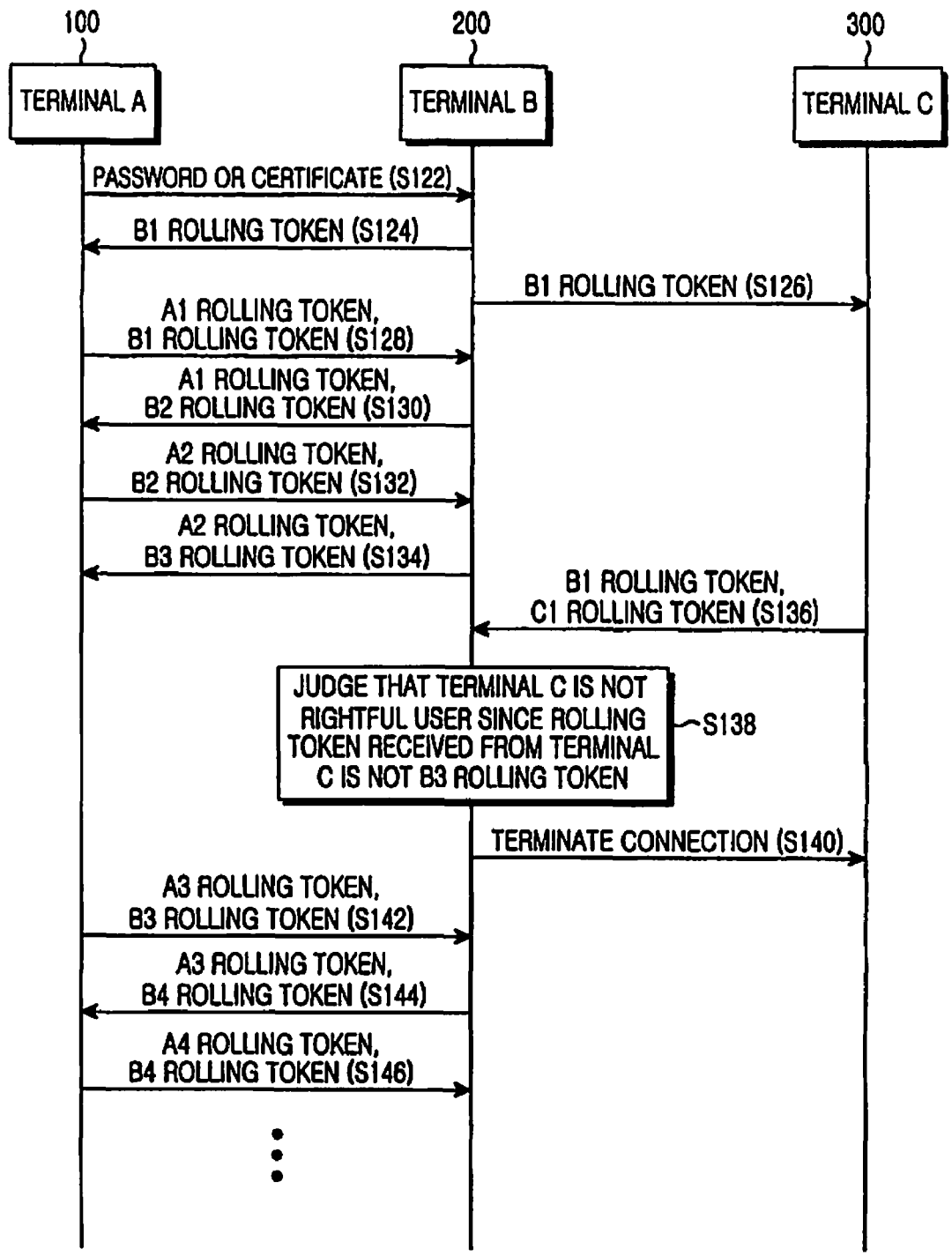
FIG. 5 is a flowchart illustrating a method for transmitting and receiving data of a terminal in a communication system according to still another embodiment of the present invention.

FIG. 5 is a flowchart illustrating a method for transmitting and receiving data of a terminal in a communication system according to still another embodiment of the present invention.

Terminal A 100 transmits a password or a certificate to terminal B 200, in step S122. Terminal B 200 authenticates terminal A 100 by comparing the password or certificate of terminal A 100 pre-stored in the memory 24 with the password or certificate received in step S122. If the authentication is completed, terminal B 200 generates a B1 rolling token for the data transmission and reception with terminal A 100.

Terminal B 200 transmits the B1 rolling token to terminal A 100, in step S124. At this time, terminal C 300 seizes the B1 rolling token being transmitted to terminal A 100, in step S126.

Terminal C 300 is an illegal invader that intervenes to deliver the time differential attacks against the data transmission and reception between terminal A 100 and terminal B 200. In a time differential attack, a user that has seized the password or certificate, illegally intervenes in the data transmission and reception between terminals by using the seized password or certificate after a predetermined time elapses. In the example according to FIG. 5, terminal C 300 is a user who has illegally intervened in the data transmission and reception between terminal A 100 and terminal B 200 in order to seize the data transmitted from terminal B 200 to terminal A 100.

Terminal A 100 transmits the A1 rolling token and the B1 rolling token to terminal B 200, in step S128. Terminal B 200 receives the A1 and the B1 rolling tokens, and generates a B2 rolling token. Terminal B 200 transmits the A1 rolling token and the B2 rolling token to terminal A 100, in step S130. Terminal A 100 receives the A1 rolling token and the B2 rolling token, and generates an A2 rolling token. Terminal A 100 transmits the A2 rolling token and the B3 rolling token to terminal B 200, in step S132.

In this case, it is assumed that terminal C 300 generates a C1 rolling token, and transmits the B1 rolling token seized en route, in step S126, and the C1 rolling token, to terminal B 200, in step S136. Since the rolling token received from terminal C 300 is not the B3 rolling token last generated, terminal B 200 determines that terminal C 300 is not a rightful user, in step S138. Terminal B 200 terminates the connection with the terminal C 300.

As described above, terminal C 300, which is the illegal user, transmits the rolling token seized in step S126 to terminal B 200. However, terminal B 20 continually performs the data transmission and reception with terminal A 100, and thus if the received rolling token is not identical to the rolling token transmitted to terminal A 100 in step S134, terminal B recognizes that terminal C 300 is not a rightful user, in step S138. Accordingly, terminal C 300 cannot receive data from terminal B 200, even though terminal C 300 has the B1 rolling token.

In still another embodiment of the present invention, the respective rolling tokens have an effective time. If the effective time elapses, even when the received rolling token is identical to the rolling token pre-stored in the memory 24, terminal A 100 or terminal B 200 may not recognize that the opposite terminal that has transmitted the rolling token is a rightful user.

On the other hand, terminal A 100, which has received the A2 rolling token and the B3 rolling token from terminal B 200 in step S1134, generates an A3 rolling token. Terminal A 100 transmits the A3 rolling token and B4 rolling token to terminal B 200, in step S142. Terminal B 200 receives the A3 rolling token and the B4 rolling token from terminal A 100, and transmits the B4 rolling token. Terminal B 200 transmits the A3 rolling token and the B4 rolling token to terminal A 100, in step S146. By repeating the above-described steps, terminal A 100 and terminal B 200 perform the data transmission and reception with each other.

As described above, according to the present invention, the exposure of authentication information can be minimized in a communication system.

According to the present invention, by using rolling tokens instead of authentication information, such as a password or a certificate, the invasion of illegal users who have not been authenticated can be detected, and man-in-the-middle attacks, etc. can be prevented.

According to the present invention, by using rolling tokens instead of a password or a certificate that requires a complicated operation, the number of operations is reduced, and thus the amount of data being transmitted and received is reduced to prevent overload of the communication system.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A communication terminal comprising:
    a rolling token generation unit for generating rolling tokens;
    a memory for storing the generated rolling tokens; and
    a control unit for controlling the rolling token generation unit to, when an authentication of another terminal for performing a communication is completed, generate and transmit a first rolling token to the another terminal, for, when receiving a second rolling token and a third rolling token from the another terminal, determining whether the second rolling token currently received from the another terminal is identical to the first rolling token, and for, when the second rolling token is identical to the first rolling token, controlling the rolling token generation unit to generate a fourth rolling token and transmit the third rolling token and the fourth rolling token to the another terminal, and wherein when a plurality of rolling tokens transmitted is received within a specified time, the control unit requests authentication information from the another terminal, receives the requested authentication information from the another terminal, and performs the authentication of the another terminal.

2. The communication terminal as claimed in claim 1, wherein when the second rolling token is not identical to the first rolling token, the control unit terminates a connection with the another terminal.

3. The communication terminal as claimed in claim 1, wherein the first rolling token includes a random number and a timestamp.

4. A method for transmitting and receiving data of a terminal, the method comprising the steps of:
    (1) receiving, by the terminal, an authentication request from another terminal, and when the requested authentication of the another terminal is completed, generating and storing, by the terminal, a first rolling token;
    (2) transmitting the first rolling token to the another terminal;
    (3) receiving, from the another terminal, a second rolling token and a third rolling token, the third rolling token generated by the another terminal;
    (4) determining whether the first rolling token is identical to the second rolling token, and when the first rolling token is identical to the second rolling token, generating and storing a fourth rolling token; and
    (5) transmitting the third rolling token and the fourth rolling token to the another terminal, and wherein when a plurality of rolling tokens transmitted is received within a specified time, the terminal requests authentication information from the another terminal, receives the requested authentication information from the another terminal, and performs the authentication of the another terminal.

5. The method as claimed in claim 4, further comprising
    (6) receiving, from the another terminal, a fifth rolling token and a sixth rolling token, the sixth rolling token generated by the another terminal;
    (7) determining whether the fourth rolling token is identical to the fifth rolling token, and when the fourth rolling token is identical to the fifth rolling token, generating and storing a seventh rolling token; and
    (8) transmitting the sixth rolling token and the seventh rolling token to the another terminal.

6. The method as claimed in claim 4, wherein the first rolling token includes a random number and a timestamp.

7. A method for transmitting and receiving data of a terminal in a communication system including a first terminal and a second terminal, comprising the steps of:
    receiving an authentication request from the first terminal, and when the requested authentication of the first terminal is completed, generating and transmitting a first rolling token to the first terminal;
    receiving, from the first terminal, the first rolling token and a second rolling token generated by the first terminal;
    receiving, from the second terminal, the first rolling token and a third rolling token generated by the second terminal;
    when the first rolling token received from the first terminal and the second terminal is identical to the generated first rolling token, requesting authentication information from the first terminal and the second terminal;
    receiving the requested authentication information from the first terminal and the second terminal, and determining whether the received authentication information is correct; and
    determining that the first terminal, of which the authentication is completed, is the terminal of which the authentication information is correct in accordance with the result of the determination, generating a fourth rolling token, and transmitting the second rolling token and the fourth rolling token to the first terminal.

8. The method as claimed in claim 7, further comprising terminating a connection with the second terminal of which the authentication information is not correct in accordance with the determination result.

9. The method as claimed in claim 7, wherein each of the first through fourth rolling tokens includes a random number and a timestamp.

* * * * *